May 8, 1962 G. BADALAMENTI 3,033,451

SLIDE RULE FOR ASCERTAINING THE DIVISIBILITY OF NUMBERS AND FOR THE RESOLUTION INTO PRIME NUMBER FACTORS OF SUCH NUMBERS

Filed July 13, 1959

INVENTOR.

Gaetano Badalamenti

United States Patent Office 3,033,451

Patented May 8, 1962

3,033,451

SLIDE RULE FOR ASCERTAINING THE DIVISIBILITY OF NUMBERS AND FOR THE RESOLUTION INTO PRIME NUMBER FACTORS OF SUCH NUMBERS

Gaetano Badalamenti, Via Adda 13, Suisio, Bergamo, Italy

Filed July 13, 1959, Ser. No. 826,720
Claims priority, application Italy July 14, 1958
6 Claims. (Cl. 235—89)

The present invention relates to a slide rule, for ascertaining the divisibility of certain numbers and for resolving such numbers into prime number factors, the reading of the results being achieved on the slide rule itself by means of a cursor which is capable of effecting two movements, one in transverse direction and the other in the longitudinal direction of said slide rule.

According to the invention, in order to provide a rule attaining the objects of the invention, cartesian co-ordinates are plotted on a strip, and more particularly a metal strip, or a plastic strip or a strip of any sufficiently hard material. On both axes of co-ordinates, a certain number of points which are equidistant between each other are plotted. The points of the axis of abscissas (X) indicate the values consisting for instance of the numbers 1, 2, 3, 4 . . . 100 or more simply of 1, 3, 5, 7 . . . 99 (odd numbers) are allotted, whereas the points of the axis of ordinates (Y) indicate the values 0, 100, 200, 300, 400 . . . N.

Now, the parallels to the axis of ordinates (Y) are traced with respect to each of the points 1, 2, 3, 4 . . . 100 or of the points 1, 3, 5, 7 . . . 99, and there are also traced the parallels to the axis of abscissas (X) for the points 0, 100, 200, 300 . . . N.

It is thus obtained a checkered area defined by the two axes of co-ordinates. More particularly, it is observed that each intersection between a parallel to the axis of abscissas and a parallel with respect to the axis of ordinates may be individuated by means of a pair of numbers. For instance, the fourth parallel to the axis of abscissas (which passes through the point numbered 300 on the axis of ordinates), when intersecting the seventh parallel to the axis of ordinates (which passes through the point 13 on the axis of abscissas or through the point 7, if the series 1, 2, 3, 4 . . . 100 is traced), will define an intersection point which may be individuated by the pair (300, 13) or by the pair (300, 7). In a similar manner, all the other intersection points of the checkered area may be individuated, so that it may be assumed that the area comprised between the two axes represents the series of the natural numbers (or of the odd numbers).

It will be now observed that if the multiples of any number whatsoever is marked by an asterisk or any other mark, in the above described area, an ordered and aligned series of marks are formed, which may be connected in various manners by straight lines.

According to the invention a row of such asterisks or marks is connected in such a manner, that the connecting straight line touches only the intersection points individuated by asterisks, but not the other intersections. Thus a straight line is obtained, which passes only through the multiples of a number and which may be expressed by an equation of the kind $x=ny+m$. With the same equation, by changing only the value of $m$, the other straight lines may be expressed, which are parallel to the described one, and which connect the other points of said area and, which are multiples of the same number and are marked by asterisks. The angle alpha formed by these straight lines and the axis of abscissas may be calculated.

This procedure has to be followed for the prime numbers 2, 3, 5, 7, 11 . . . $n$, so as to obtain individual groups of parallel straight lines. Such groups distinguish one from the other by the angle, which the parallels form with the axis of abscissas.

Such angle may be transferred on a protractor or goniometer, in order to individuate the straight line to which said angle is referred when it will be necessary to point out such line among the other straight lines representing the multiples of other numbers.

The protractor or goniometer for facilitating the search of the point corresponding to the number to be resolved, will be arranged on a cursor which, by means of a double movement (horizontally and vertically), follows the ordinates and abscissas, and individuates the same by means of reading lines (similar to a lubber line) extending vertically and horizontally, and of a circular sight means, or the like which serves for individuating the intersection of these co-ordinates.

The slide rule, according to the invention, will be now described with more details with reference to a preferred embodiment of such slide rule, which is illustrated in the accompanying drawings, given for indicative and non limitative purposes. In the drawings.

Figures 1, 2, 3, 4:
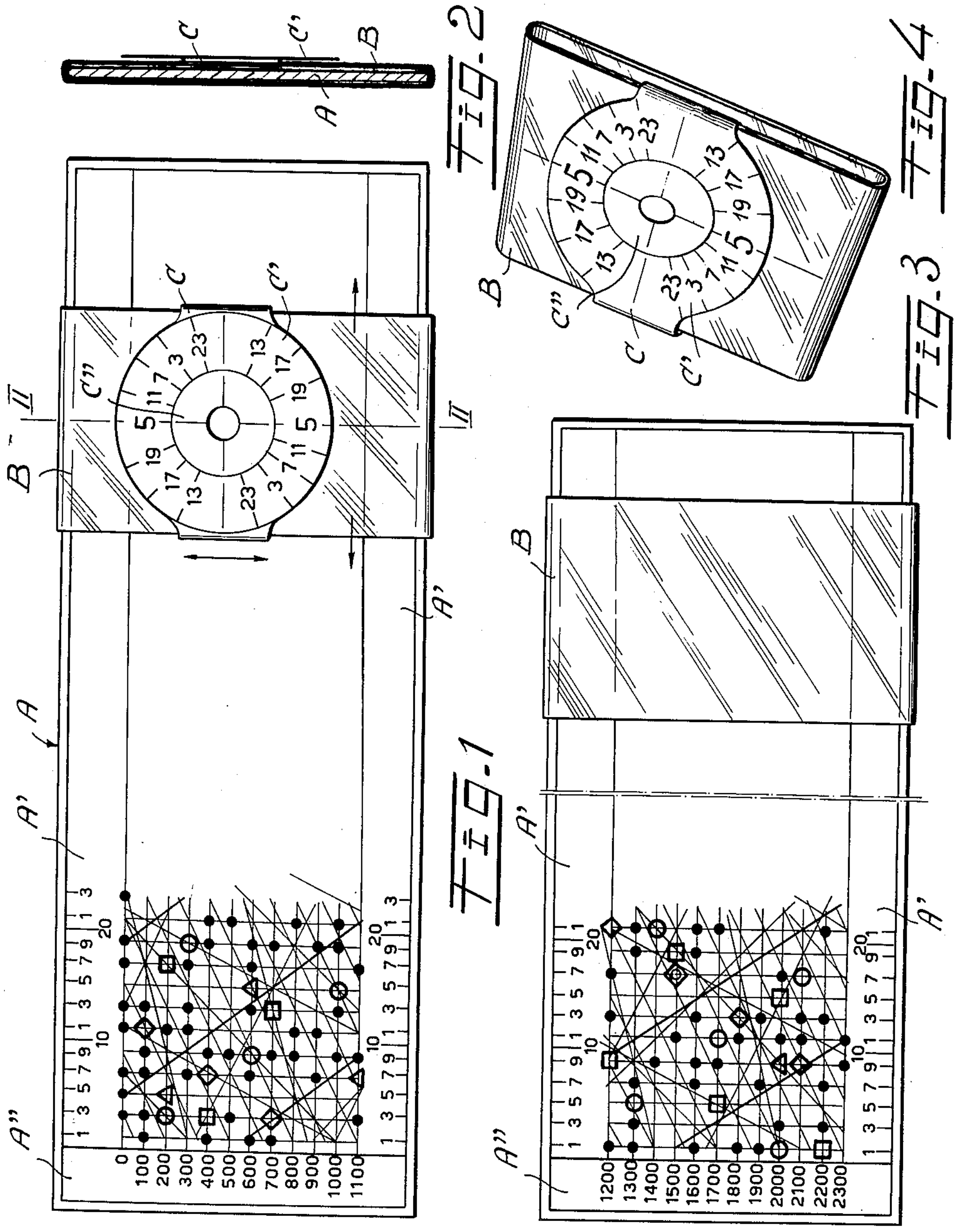
FIG. 1 shows an elevation of the slide rule.
FIG. 2 shows the slide rule in a cross sectional view along line II—II of FIG. 1.
FIG. 3 is an elevation showing the reverse side of the slide rule.
FIG. 4 shows in an elarged scale a perspective view of the cursor.

In the drawing A indicates a strip of hard material forming the main supporting part of the slide rule, on the longitudinal borders A′ of which strip there are marked the numbers from 1 to 100 or more simply the odd numbers from 1 to 99, which correspond to the values of the axis of abscissas, whereas on the left hand border (with respect to FIG. 1), or possibly on both lateral borders, there are marked the values of the axis of ordinates, taken from 100 to the next consecutive 100, i.e. the values 0, 100, 200, 300 . . . $n$. On the rear face of the strip A, the same numbers as on the front face will be marked along the border corresponding to the axis of abscissas, i.e. for instance the odd numbers 1 to 99, whereas on the vertical border A″, there will be marked the numbers which follow those of the front face, i.e. $n+100$, $n+200$, $n+300$ . . . 2N.

On the strip A, a cursor is slidingly mounted, which is formed of a flattened annular band B, which embraces crosswise the strip A, and of a band C, which is perpendicular to the annular band B and so embraces one side of the flattened annular band B and more precisely the front side thereof, as to be able to be vertically displaced on the same. The band C has on its front portion an annular disc C′, which is provided with an inner window C″, which is closed by a sheet of transparent material, on which a horizontal reference line is traced, which is interrupted at the center, so as to leave free a window, for a more clear reading of the intersection points, which are traced in the central field of the strip A.

The circular crown of the annular disc C′ (protractor or goniometer) has a horizontal diameter for the search of the hundreds of the number to be resolved and a circle for locating the point having the established co-ordinates.

As an example of the use of such a slide rule, it may be assumed that it is required to determine which are the prime numbers of which for instance the number 741 is a multiple, i.e. which are the prime number factors into which it may be resolved. To this end, the whole cursor, i.e. both parts B and C, are moved to the left hand part of the slide rule, and the part C is moved downwards, so that the reference pointer (index) which may be formed possibly by the horizontal diameter line, and which is individuated by the words "hundreds line" is brought to coincide with to the eighth parallel of the abscissas, which is marked by the number 700. Subsequently, the cursor B—C is displaced towards the right hand direction, until the index of the other part of the cursor indicates the number 41, i.e. the twenty-first parallel of the ordinates. At this point, in the center of the band C there will be positioned an intersection of co-ordinates (700; 41) which corresponds to the number 741.

Through such intersection, some intersection-lines are passing. The centering of the point (700; 41) is facilitated by a transparent central sight member. The intersection lines passing through the point 741 point a corresponding number of segments marked on the protractor. Near the three segments there may be read: 3, 13, 19. These are the prime number factors of the number 741. In the illustrated embodiment, the two faces of the slide rule as it may be seen in FIG. 1 and 3 are both used in order to enlarge the field of the numbers to be resolved, i.e. on one face, the numbers from 0 up to N have been marked, whereas on the other face there are marked the numbers from N+1 up to 2N. It is however obvious that a slide rule of simplified construction may be provided, wherein a single face bears the marked numbers, whereas in another embodiment the slide rule may be formed of two superimposed and mutually independent strips, which however may be connected one with the other by the same cursor, so as to have two more available faces and increase the number range which may be resolved into prime factors.

A slide rule according to the invention, for ascertaining the divisibility of certain numbers and resolving them into prime number factors, may be made of a material, which may be printed by means of one of the graphical or chemical processes well known in the art. The size of the sides may be varied at will and according to any requirement.

On the whole central plane of the rectangle forming the strip A, a series of parallel straight lines are traced, which extends parallelly to the longitudinal sides, whereas a further series of straight lines are traced on the same plane, which lines extend parallelly to the shorter sides, both series intersecting each other, so as to form a chequering.

Such a chequering may be dispensed with, if a high precision sliding of the cursor elements could be provided. On the checkered area, a plurality of conventionally marked cross lines is traced. Such conventional markings (squares, circle, triangle, and so on), corresponds to prime number factors, with respect to which there has not been recognized the utility of connecting them by straight lines, nor of transferring them on the protractor, since they resolve but few numbers. A special mark (black point or asterisk) indicates, however, that the number which corresponds to the intersection where the mark is located cannot be resolved into prime number factors, since it is itself a prime number.

The cursor, which is formed of the main part B and of the superimposed part C, has also a little mark, such as an index, at the top or at the bottom thereof, or at both positions, which may be in the form of reading lines (lubber's lines), for the search of the tens, and the units of the number to be resolved. The cursor should be made of transparent material, or of an opaque material, with a hollow part at its central zone. The ring band C' has printed thereon a crown of marks, individuated by the prime numbers 2, 3, 5, 7, 11 . . . *n*, corresponding to the above mentioned marks. Some of the prime numbers may be omitted, in order to simplify the slide rule.

The ring band C' may be inscribed on a square, so that the angular portions thereof may receive particular markings. The superimposed band C is provided, on its left and right hand sides, with bent borders, in order to embrace the cursor band B, and allow the band C itself to partially slide beyond the upper and lower border of the cursor B, for centering purposes.

I claim:

1. A slide rule for ascertaining the divisibility of a given number and for resolving many of such numbers into prime number factors, comprising in combination at least one strip of hard material, having longitudinal borders and transverse borders, a first series of progressive numbers marked along at least one of said longitudinal borders and a second series of progressive members pertaining to a selected magnitude marked along at least one of said transverse borders, longitudinal lines parallel to said longitudinal borders, each of said longitudinal lines corresponding to one of the progressive numbers of said second series, transverse lines parallel to said transverse borders, each of said transverse lines corresponding to one of the progressive numbers of said first series, said longitudinal lines and said transverse lines forming a checkered area, a series of inclined lines traced on said checkered area, these inclined lines corresponding to the locus of the points in which the multiples of a given number are situated, a cursor, including a first band with bent borders arranged to embrace the longitudinal borders of said strip and to slide thereon and a second band with bent borders arranged to embrace said first band on the border of this latter extending between said longitudinal borders and to slide on said borders of the first band, said second band having an annular portion on which the prime numbers are marked, a window in the central zone of said annular portion, reference marks on said second band for centering one of said longitudinal and one of said transverse lines, and peripheral reference marks on said annular portion corresponding to the prime numbers marked on said annular portion, each of said peripheral reference marks individuating one of the prime number factors of the number corresponding to such centered longitudinal and transverse lines when one of said inclined lines points to such peripheral reference mark.

2. A slide rule according to claim 1, wherein said first series of progressive numbers comprises the numbers from 1 to 100.

3. A slide rule according to claim 1, wherein said first series of progressive numbers comprises the odd numbers from 1 to 99.

4. A slide rule according to claim 1 wherein said second series of progressive numbers is an arithmetical progression having 100 as the increment of the arithmetical progression.

5. A slide rule according to claim 1, further comprising in said checkered area a number of marks corresponding to the prime numbers not marked on said annular portion of said second band.

6. A slide rule as claimed in claim 1, further comprising marks individuating the prime numbers in said checkered area.

No references cited.